United States Patent Office 3,491,614
Patented Jan. 27, 1970

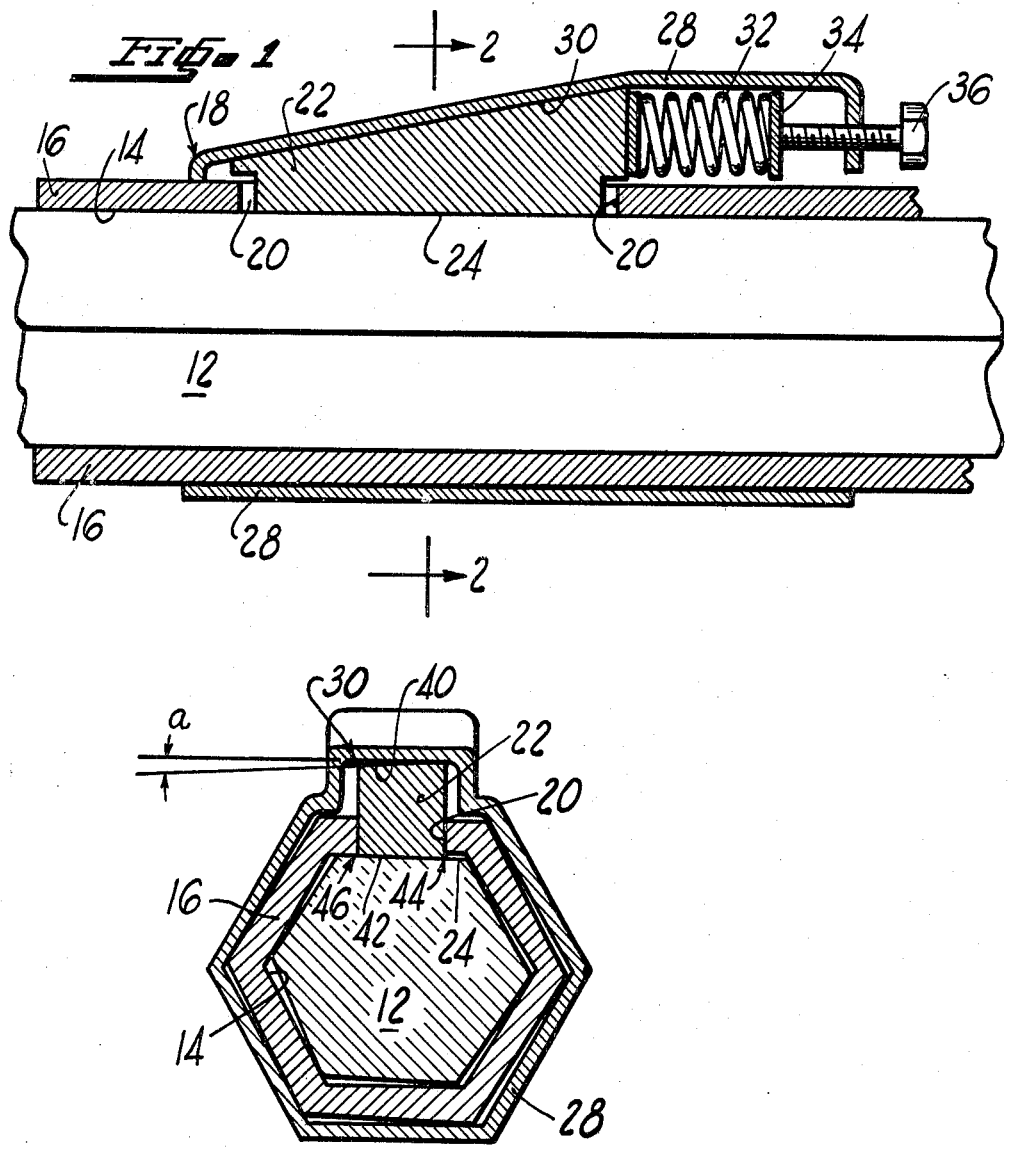

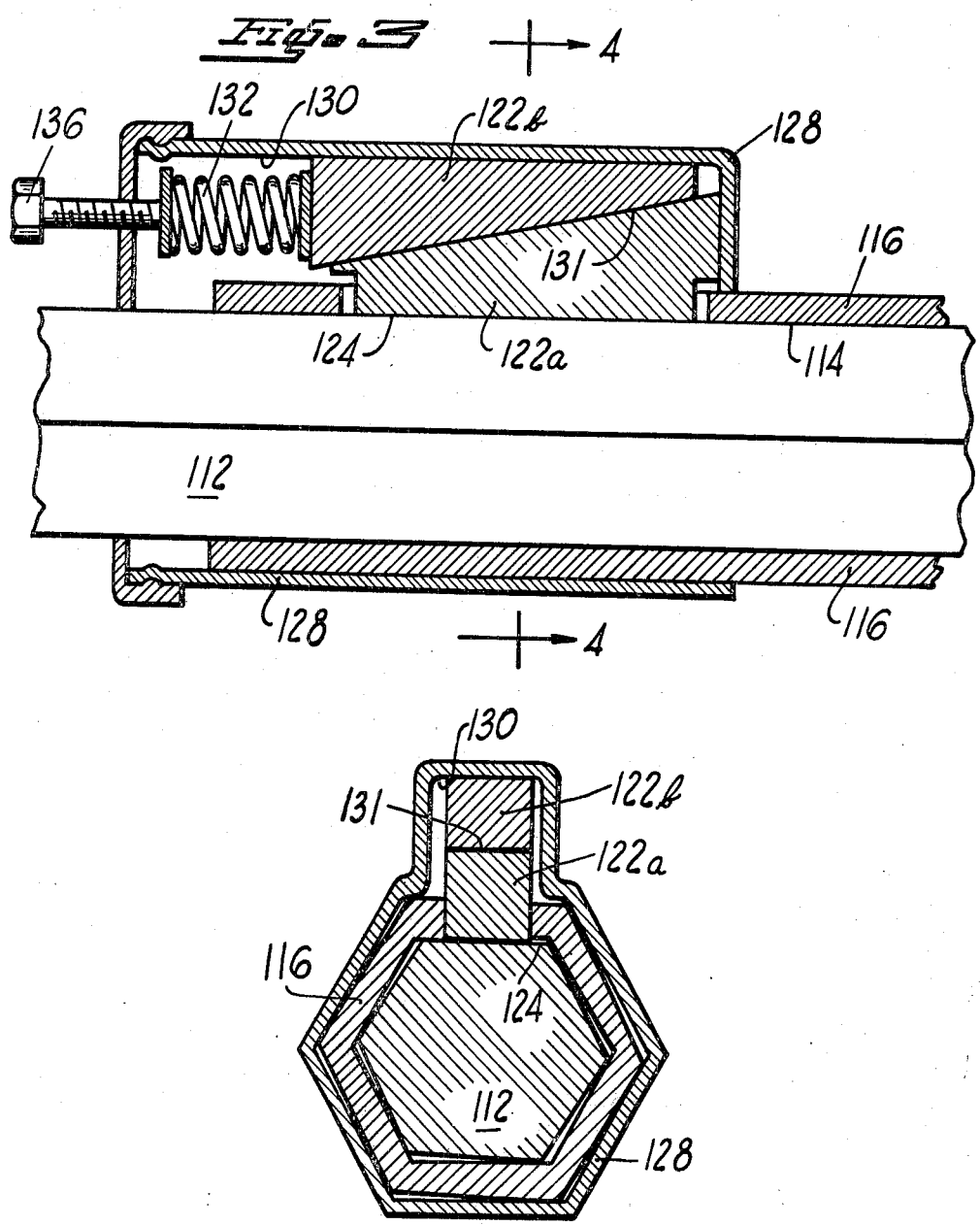

3,491,614
COLLAPSIBLE STEERING COLUMN
Cloyde E. Saunders and Harry L. Demske, South Bend, Ind., assignors to The Bendix Corporation, a corporation of Delaware
Filed July 18, 1968, Ser. No. 745,893
Int. Cl. B62d 1/18
U.S. Cl. 74—493                                        10 Claims

ABSTRACT OF THE DISCLOSURE

A steering column arrangement having telescoping shafts, the inner of which has a polygonal shape and the outer of which has a corresponding polygonal bore for receiving the first shaft. A self-contained mechanism for eliminating lost motion or "lash" between the two shafts includes a slot located in the outer shaft, wedge means located in the slot which abuts a polygonal surface of the inner shaft at an off-center location, a retainer telescoped over the inner and outer shaft having an inner surface thereof in contact with the wedge means, and resilient means confined between the retainer and wedge means for urging the retainer and wedge means in opposite axial directions whereby the wedge means is loaded and caused to move in a radially inward direction against the inner shaft.

Background of the invention

Earlier issued U.S. Patents 3,318,170 and 3,369,425 and pending U.S. application Ser. No. 690,612, now Patent No. 3,444,753 relate to lash-free axially movable steering columns for use on driver-operated motor vehicles. In the embodiments shown therein torsional lash is eliminated from two polygonal telescoping shafts of the steering column by utilizing a plurality of preloaded members located in one of the shafts which abut different polygonal surfaces of the other shaft at a location off center of the abutting polygonal surface to cause rotation and continuous frictional engagement of one of the shafts with respect to the other of the shafts to thereby eliminate torsional lash therebetween.

The instant novel mechanism, which is intended to accomplish the same end insofar as the elimination of torsional lash between two telescoping shafts is concerned, is an improvement over the aforementioned pending application in that the mechanism is self-contained within a single retainer and utilizes a minimum number of parts.

Summary of the invention

Accordingly, it is an object of this invention to provide a lash-eliminating mechanism for a telescoping steering column which is self-contained within a single retainer.

Another object of this invention is to provide a mechanism of the type described which is less expensive to fabricate and is more rugged than comparable mechanisms.

A further object of this invention is to provide a mechanism of the type described which is enclosed in such a manner that exernal forces or blows will not cause the components thereof to bind.

A still further object of this invention is to provide a lash-free telescoping steering column which will collapse when it is subject to a predetermined load.

Another object of this invention is to provide a self-contained mechanism of the type described which includes means for adjusting the collapse load of the steering column.

More specifically, it is an object of this invention to provide a mechanism of the type described which includes a slot located in the outer shaft, wedge means located in the slot which abuts a polygonal surface of the inner shaft at an off-center location, a retainer telescoped over the inner and outer shafts and having an inner surface thereof in contact with the wedge means, and preloaded resilient means located between the retainer and wedge means for urging the retainer and wedge means in opposite axial directions whereby the wedge means is loaded and caused to move in a radially inward direction against the inner shaft. The wedge means can be formed as a single wedge block which engages a ramp formed on the inner surface of the retainer or can be formed of primary and secondary wedge blocks wherein the contacting surfaces of the wedge blocks define a ramp.

The above and other objects and features of this invention will become apparent from the following description taken in connection with the accompanying drawings.

Brief description of the drawings

FIGURE 1 is an enlarged sectional view of a portion of a steering column of a vehicle showing the axially movable components thereof and the mechanism incorporating the invention;

FIGURE 2 is an exaggerated sectional view taken along line 2—2 of FIGURE 1;

FIGURE 3 is a sectional view similar to that of FIGURE 1 which shows another embodiment of the invention; and FIGURE 4 is an exaggerated sectional view taken along line 4—4 of FIGURE 3.

Description of the preferred embodiments

Referring to FIGURES 1 and 2 it will be seen that a shaft 12 having a hexagonal shape is located in a corresponding hexagonal bore 14 formed in a shaft 16. One of the shafts is suitably connected to the steering wheel (not shown) of a vehicle, whereas the other of said shafts is suitably connected to the steering gear (not shown) of the vehicle. If needed, it will be understood that a universal joint of the type disclosed in U.S. Patent No. 3,296,830, issued Jan. 10, 1967, can be interposed between the steering wheel and the shaft connected thereto and/or the steering gear and the shaft connected thereto. Because of the telescopic arrangement between shafts 12 and 16 it will be apparent that axial adjustment of the vehicle steering wheel can be accomplished by pushing or pulling on the steering wheel. Furthermore, in the event of an accident, injury to the driver wll be minimized because the steering column can telescope or collapse upon impact.

Since it is impractical from a tolerance standpoint to make the telescoping shafts 12 and 16 lash-free, a self-contained coupling mechanism, indicated generally by the numeral 18, is utilized to cause relative rotation and continuous frictional engagement between the two shafts. The coupling mechanism includes an axially extending slot 20, located in outer shaft 16, which contains a wedge block 22 of corresponding shape, said wedge block being arranged to abut the polygonal surface 24 of shaft 12 at an off-center location thereof. A retainer 28, which is telescoped over the inner and outer shafts 12 and 16, includes an inner surface 30 formed as an inclined ramp which contacts the wedge block. The retainer and wedge block are arranged so that relative axial movement therebetween will load the wedge block and cause radially inward movement thereof against the inner shaft 12. A preloaded spring 32, which is confined between the retainer 28 and wedge block 22, urges the retainer and wedge block in opposite axial directions and controls the load exerted by the wedge block in a radially inward direction against the inner shaft. The spring 32 is shown as abutting a movable endplate 34 the axial position of which is determined by an adjusting screw 36. The function of the adjusting screw is to provide means for varying the preload of the spring to any desired predetermined value simply by rotating the adjusting screw. Thus, rotation of the screw in one direction will cause relative axial movement in a direction tending to increase the load exerted by the wedge block, whereas rotation of the adjusting screw in the other direction will cause relative axial movement in an opposite direction tending to decrease the load exerted by the wedge block. If desired the adjusting screw could be eliminated so that the spring 32 would have a constant preload for a given self-contained installation. It will be apparent that loading of the wedge block in the manner described will produce relative rotation between the inner and outer shafts so that undesirable lash therebetween will be eliminated.

It will be noted from FIGURE 2 that the wedge block is formed with a first axially inclined surface 40 which contacts the axially inclined inner surface 30 of the retainer 28, and a second surface 42 which contacts the abutting polygonal surface 24 of the inner shaft 12. The second surface 42 includes a primary torque transmitting edge 44 and a secondary torque transmitting edge 46, the first of which 44 is spaced more distant from the center line of the abutting polygonal surface than the other edge 46. In order to cause the load exerted against the wedge block to concentrate at the primary torque transmitting edge 44, it will be noted from FIGURE 2 that the axially inclined plane of the ramp 30 is angularly disposed by an angle $a$ in a transverse plane with respect to the contacting wedge block surface. This and related features are disclosed and claimed in more detail in copending application Ser. No. 690,612.

Referring to FIGURES 3 and 4, wherein like parts are designated by the same numeral plus 100, it will be seen that the configuration of the retainer 128 is such that it can be a relatively inexpensive straight hex extrusion of metal or plastic. In other words, the inner surface 130 is substantially parallel to the centerline of the polygonal surface 124 of the inner shaft 112. With such an arrangement primary and secondary wedge blocks 122a and 122b, respectively, are located and arranged between the inner surface 130 of the retainer and the polygonal surface 124 of the inner shaft 112 so that the primary wedge block 122a engages the inner shaft and the secondary wedge block 122b engages the primary wedge block and the inner surface of the retainer. From the drawing it will be seen that the contacting surfaces of the primary and secondary wedge blocks define a ramp 131. A spring 132 is confined within the retainer in essentially the same manner as in FIGURE 1, except that it abuts the secondary wedge block 122b. Relative axial movement between the retainer and secondary wedge block causes loading and radially inward movement of the primary wedge block against the inner shaft. The preload of the spring 132 can be varied by rotation of the adjusting screw 136 in the same manner as previously described.

From the foregoing, it will be apparent that this invention provides a unique coupling mechanism for a telescoping column which is lash-free and adjustable for preload. Some of the advantages of the mechanism are that it is self-contained within a single retainer, it is arranged so as to prevent external forces of blows from causing the components thereof from binding, it provides an adjustable preload, and it requires a minimum of parts. Other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of parts without departing from the spirit of the invention. For example, shafts having shapes and corresponding bores other than hexagonal would be suitable in the practice of this invention.

Having thus described the various features of the invention what we claim as new and desire to secure by Letters Patent is:

1. An axially movable steering column comprising inner and outer shafts, one of which is axially movable with respect to the other of said shafts, said inner shaft having a polygonal shape and said outer shaft having a corresponding polygonal bore therein for receiving said inner shaft, a self-contained mechanism operatively connected to said inner and outer shafts for causing rotation and continuous frictional engagement of one of said shafts with respect to the other of said shafts to thereby eliminate torsional lash therebetween, said mechanism comprising a slot located in said outer shaft, wedge means located in said slot for abutting a polygonal surface of said inner shaft at a location spaced from the centerline of said polygonal surface, retainer means telescoped over said inner and outer shafts, said retainer means having an inner surface thereof in contact with said wedge means, said retainer means and wedge means being arranged so that relative axial movement therebetween will load said wedge means and cause radially inward movement thereof against said inner shaft, and preloaded resilient means located between said retainer means and wedge means for urging said retainer and wedge means in opposite axial directions.

2. The structure, as defined in claim 1, wherein said retainer means includes end plate means for abutting said resilient means.

3. The structure, as defined in claim 2, wherein said retainer means includes adjustment means for axially moving said endplate means to vary the preload of said resilient means.

4. The structure, as defined in claim 1, wherein the contacting inner surface of said retainer means comprises a ramp for engaging said wedge means.

5. The structure, as defined in claim 1, wherein said wedge means includes a primary wedge block which engages said inner shaft and a secondary wedge block which is located between and in contact with said primary wedge block and said inner surface of said retainer means.

6. The structure, as defined in claim 5, wherein the contacting surfaces of said primary and secondary wedge blocks define a ramp.

7. The structure, as defined in claim 6, wherein said resilient means is located between said retainer means and said secondary wedge block.

8. The structure, as defined in claim 7, wherein said inner surface of said retainer means is substantially parallel to the centerline of said polygonal surface which is in abutment with said primary wedge block.

9. The structure, as defined in claim 7, wherein said retainer means includes endplate means for abutting said resilient means.

10. The structure, as defined in claim 8, wherein said retainer means includes adjustment means for axially moving said endplate means to vary the preload of said resilient means.

References Cited

UNITED STATES PATENTS

| 2,797,942 | 7/1957 | Schwalbe | 287—58 |
| 2,838,266 | 6/1958 | Rees | 287—58 X |
| 3,318,170 | 5/1967 | Runkle | 74—493 |
| 3,444,753 | 5/1969 | Runkle | 74—493 |

MILTON KAUFMAN, Primary Examiner

U.S. Cl. X.R.

74—531; 287—58